US005539422A

United States Patent [19]
Heacock et al.

[11] Patent Number: 5,539,422
[45] Date of Patent: Jul. 23, 1996

[54] HEAD MOUNTED DISPLAY SYSTEM

[75] Inventors: Gregory L. Heacock, Camas; Kyle S. Johnston, Kirkland; Tomas E. Lock, Woodinville; Wayde H. Watters, Kent, all of Wash.

[73] Assignee: Virtual Vision, Inc., Redmond, Wash.

[21] Appl. No.: 45,919

[22] Filed: Apr. 12, 1993

[51] Int. Cl.⁶ ........................................... G09G 3/02
[52] U.S. Cl. .............................. 345/8; 359/631; 351/158
[58] Field of Search ................................. 359/630, 629, 359/174; 353/13, 14, 122; 351/158, 50; 345/7, 8, 9; 340/980

[56] References Cited

U.S. PATENT DOCUMENTS

| | | | |
|---|---|---|---|
| 3,738,733 | 6/1973 | Pettit | 359/630 |
| 4,600,721 | 7/1986 | Boyer et al. | 359/630 |
| 4,634,246 | 1/1987 | Dreyer, Jr. | 353/98 |
| 4,838,647 | 6/1989 | Fagard | 345/7 |
| 4,869,575 | 9/1989 | Kubik | 350/174 |
| 5,162,828 | 11/1992 | Furness | 352/122 |
| 5,170,190 | 12/1992 | Berke | 351/158 |
| 5,172,100 | 12/1992 | Iino | |

FOREIGN PATENT DOCUMENTS 497193   3/1992   Japan ........................................ 345/7

Primary Examiner—Raymond J. Bayerl
Assistant Examiner—Doon Chow
Attorney, Agent, or Firm—McAndrews, Held & Malloy, Ltd.

[57] ABSTRACT

A head mounted display system is shown having a single optical element. The single optical element has three optical surfaces. An entrance surface receives a video image directly from a display. A reflective surface reflects the video image from the entrance surface to an exit surface wherein the user views the video image directly through the exit surface. The three optical surfaces are shaped to generate a virtual image that is magnified, appears at a distance from the user and substantially free from distortion, astigmatism and chromatic aberrations. The optical element is adjustably mounted on a frame of the head up display system to accommodate users with different interpupillary distances and to vary the apparent distance between the user and virtual image.

66 Claims, 10 Drawing Sheets

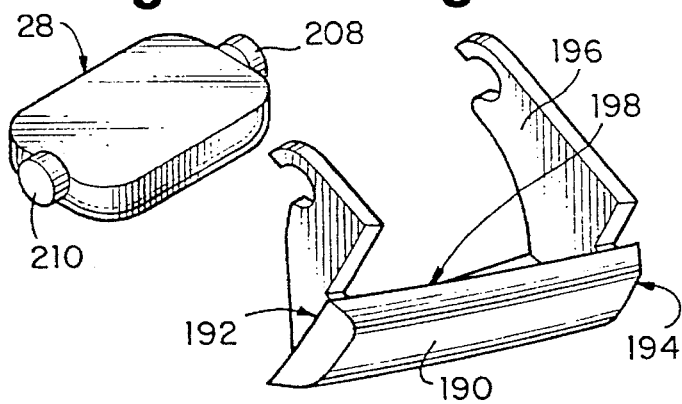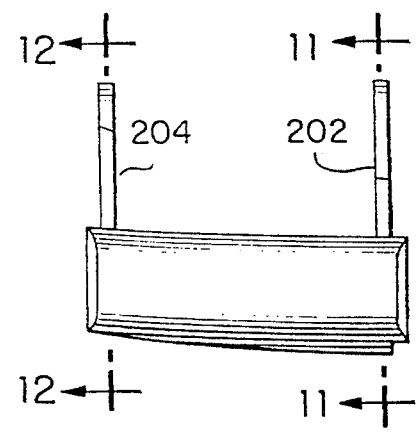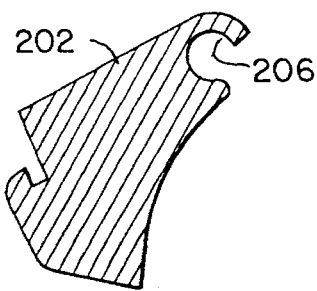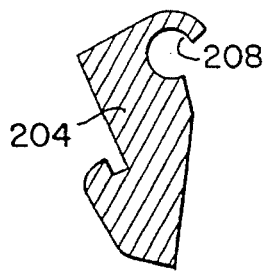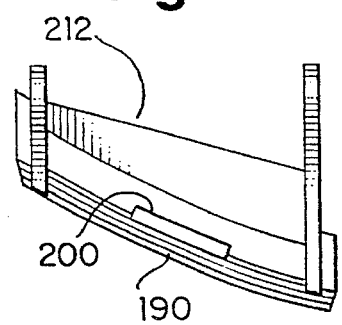

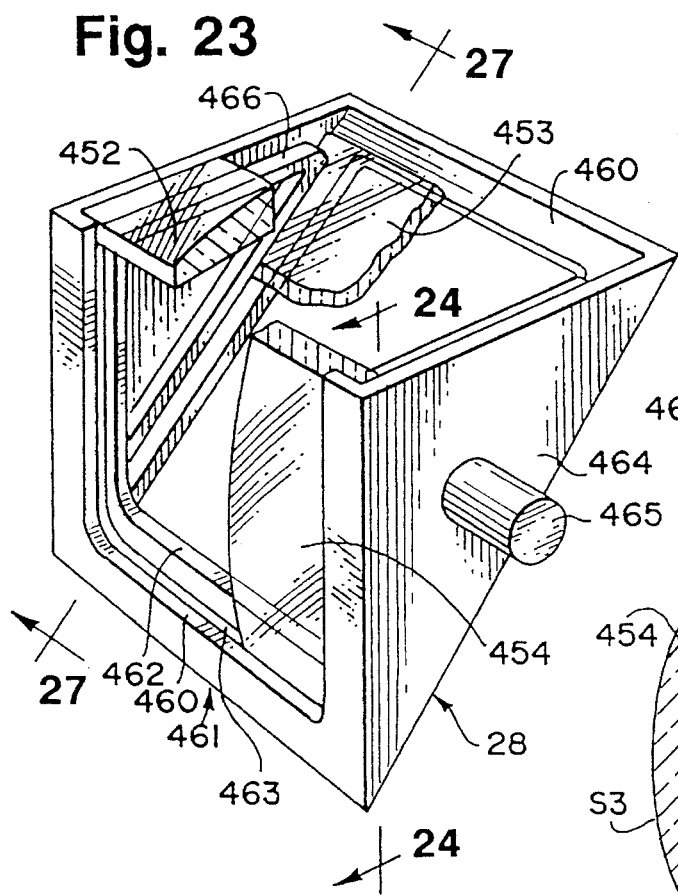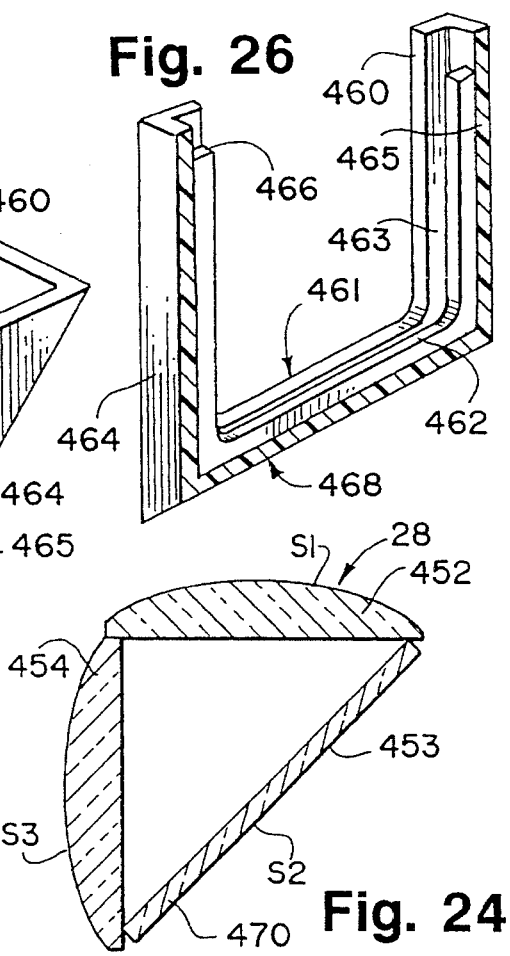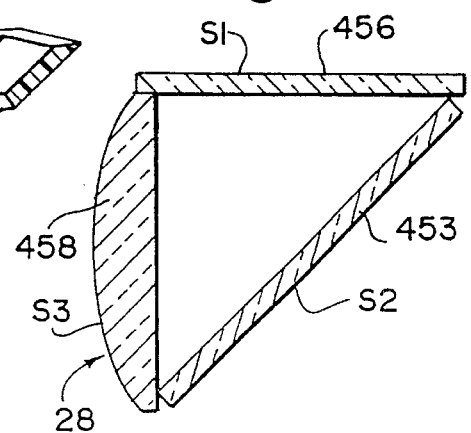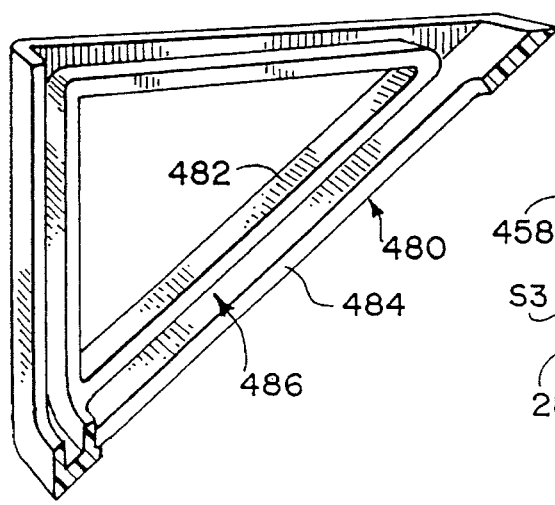

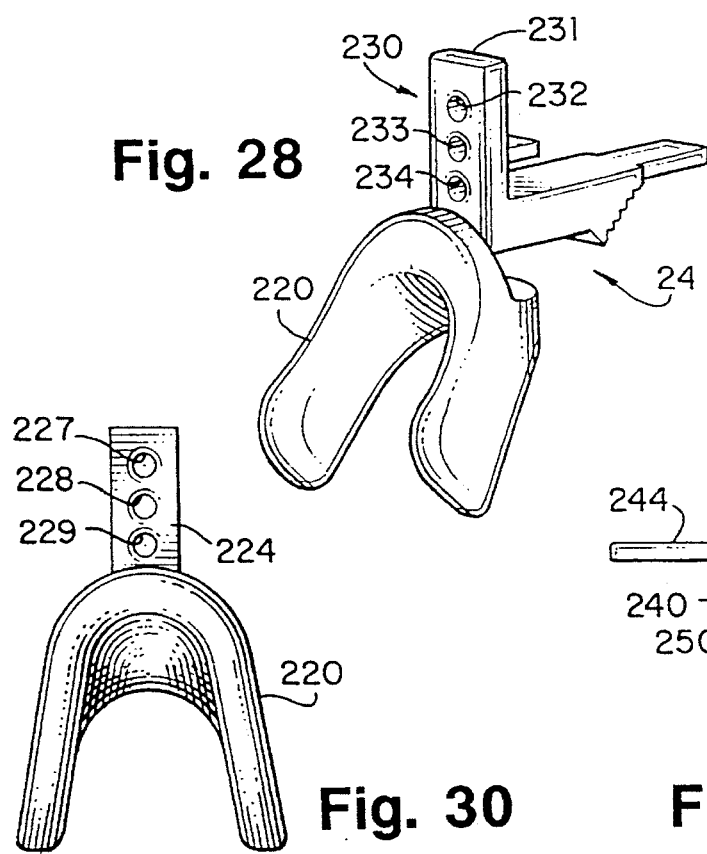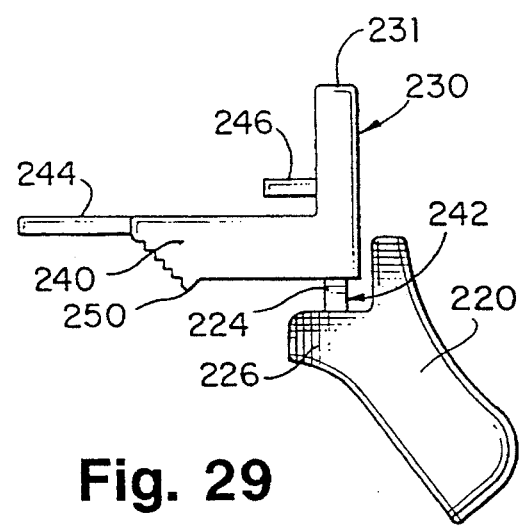

HEAD MOUNTED DISPLAY SYSTEM

This application is related to U.S. patent application Ser. No. 07/985,876, filed Dec. 4, 1992.

TECHNICAL FIELD

The present invention is directed to a head mounted display system and more particularly to an optical element for use in such a system, the optical element having an entrance surface for receiving video information from a display, an exit surface wherein a user views the video image directly through the exit surface and a reflective surface for reflecting the video image from the entrance surface to the exit surface. The entrance surface, reflective surface, and exit surface of the optical element are shaped to generate a virtual image of the displayed video image that is magnified, has an apparent location a distance from the user and is substantially free from distortion, astigmatism and chromatic aberrations.

BACKGROUND OF THE INVENTION

Known head mounted or head-up display systems are typically used for military applications. For example, a head-up display may be mounted on a helmet worn by a pilot in order to project an image in the pilot's direct line of sight and at infinity to aid the pilot in carrying out a military operation. Such systems typically include a cathode ray tube, CRT, that is mounted on the pilot's helmet where the CRT receives video information via heavy cables that are coupled to video display generating equipment that is fixedly mounted on the aircraft. Because these systems are cumbersome, bulky and heavy, they are not suitable for consumer type applications. Further, known head mounted display systems typically utilize components such as a display and a number of optical elements that are mounted in a fixed relation to one another. Such systems typically can only accommodate a small range of head sizes. Manufacturing head mounted display systems with various fixed configurations so as to accommodate different head sizes is extremely expensive; however, if the system cannot accommodate a wide range of head sizes, the system is not suitable for consumer use since the head size among consumers varies greatly. Further, the large number of optical elements utilized in these systems adds to the cost of any one fixed configuration.

One known display system as shown in U.S. Pat. No. 5,162,828 has an optical system that includes only a single mirror. The mirror receives information directly from the display wherein the mirror is shaped to have a toroidal, parabolic or zernike polynomial reflecting surface so as to project an enlarged image at an apparent distance from the user that is greater than the actual optical path between the display, mirror and user's eye. This optical system is low cost because it utilizes a single optical element, the mirror. Further, the mirror provides a good quality virtual image for many applications. However, because the mirror includes only a single optical surface, it is difficult to shape that surface so as to minimize distortion and astigmatism.

SUMMARY OF THE INVENTION

In accordance with the present invention, the disadvantages of known head-up display systems have been overcome. The head mounted display system of the present invention includes an optical element that has a plurality of optical surfaces. The optical surfaces are shaped so as to provide a virtual image of a displayed video image wherein the virtual image is magnified; has an apparent location a distance from the user that is substantially greater than the length of the actual path between the display, optical element and user's eye; and is substantially free from distortion, astigmatism and chromatic aberrations. Thus the head-up display system of the present invention is suitable for displaying video information including movies and text with high resolution and overall quality.

More particularly, the optical element includes an entrance surface that receives the video image from the display, an exit surface wherein the user views the video image directly through the exit surface and a reflective surface for reflecting the video image from the entrance surface to the exit surface. These surfaces are shaped so as to provide the magnified virtual image at a distance from the user and to substantially reduce distortions and astigmatism, as compared to a single toroidal mirror, while also minimizing chromatic aberrations.

In accordance with one embodiment of the present invention, each of the entrance, reflective and exit surfaces is curved so as to contribute to the magnification of the displayed video image. In another embodiment only the entrance and exit surfaces are curved and in still a further embodiment only the exit surface is curved.

The optical element may be formed as a solid block of one material. The optical element may also be formed as a solid block comprised of two or more materials forming an achromat. Alternatively, the optical element may be hollow or air filled. The hollow optical element may include a mounting member on which an entrance lens, reflector and exit lens are bonded so as to form a single, integral optical element.

In order to allow the location of the virtual image to be varied such that the user perceives that the distance between he and the virtual image is changing, an adjustable mounting is provided for the optical element to allow the user to increase or decrease the distance between the entrance surface of the optical element and the display.

The optical element is also movable in a generally horizontal direction to allow the optical element to accommodate users having different interpupillary distances.

These and other objects, advantages and novel features of the present invention as well as details of an illustrated embodiment thereof, will be more fully understood from the following description and the drawing.

BRIEF DESCRIPTION OF THE DRAWING

FIG. 8A is a perspective view of one embodiment of an optical element in accordance with the present invention;

FIG. 8B is a perspective view of a support for the optical element shown in FIG. 8A;

FIG. 9 is a back view of the support depicted in FIG. 8B;

FIG. 10 is a cross sectional view of the support taken along lines C—C of FIG. 9;

FIG. 11 is a cross sectional view of a support taken along lines A—A of FIG. 9;

FIG. 12 is a cross sectional view of a support taken along lines B—B of FIG. 9;

FIG. 23 is a perspective view of a second embodiment of a hollow optical element in accordance with the present invention;

FIG. 24 is a cross sectional view illustrating the lenses and reflectors of one embodiment of the hollow optical element depicted in FIG. 23;

FIG. 25 is a cross sectional view of the lenses and reflector of a second embodiment of the hollow optical element depicted in FIG. 23;

FIG. 26 is a cross sectional view taken along lines of the mounting fixture depicted in FIG. 23 taken along lines A—A;

FIG. 27 is a cross sectional view of the mounting fixture depicted in FIG. 23 taken along lines B—B;

FIG. 28 is a perspective view of a nose bridge mounted in a nose bridge support;

FIG. 29 is a side view of the nose bridge and nose bridge support depicted in FIG. 28;

FIG. 30 is a front view of the nose bridge depicted in FIG. 28;

DESCRIPTION OF THE PREFERRED EMBODIMENT

Figure 1:
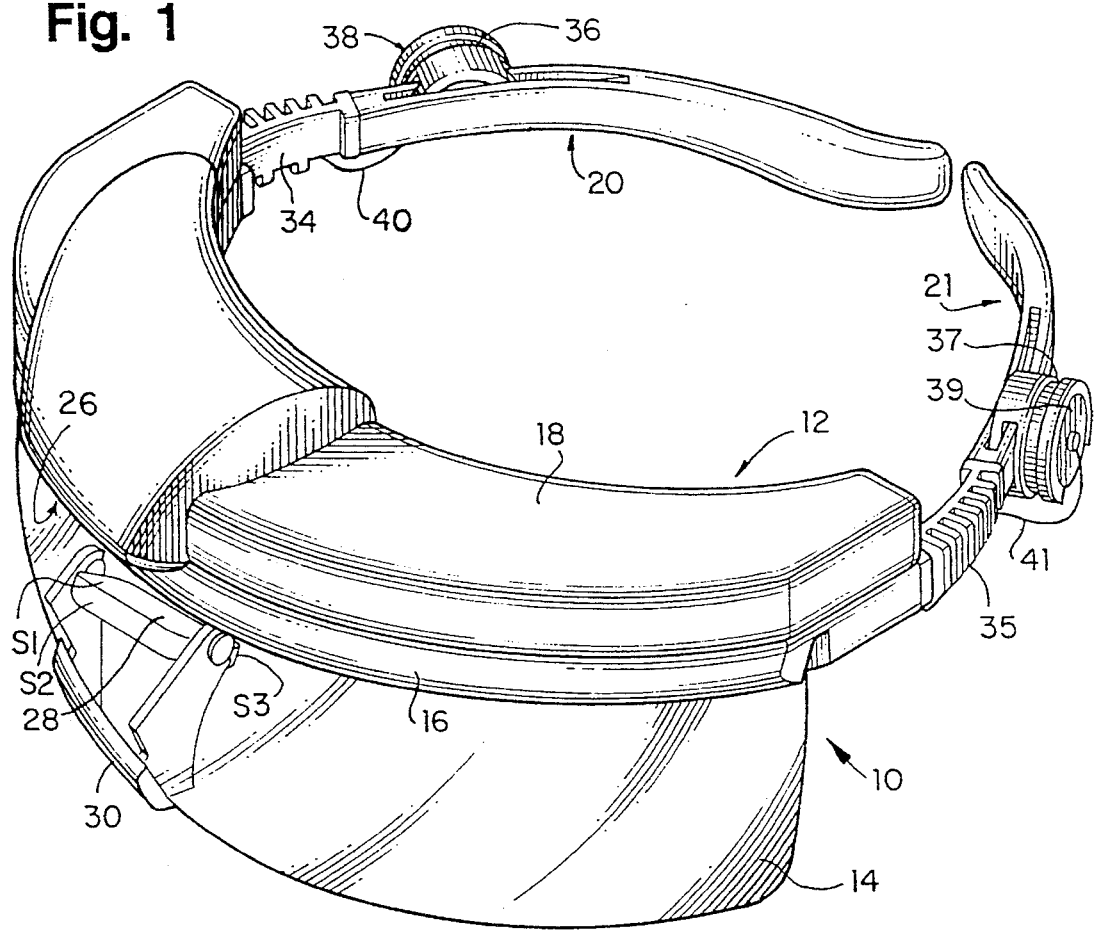
FIG. 1 is a front perspective view of the head mounted display system of the present invention taken from the side.
Figure 2:
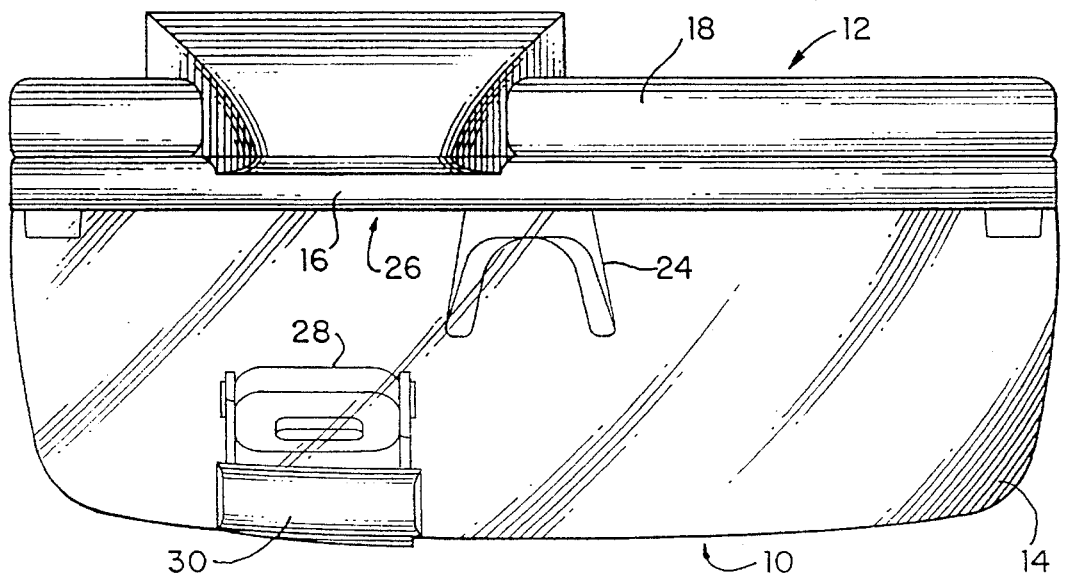
FIG. 2 is a front view of the head mounted display system depicted in FIG. 1.
Figure 3:
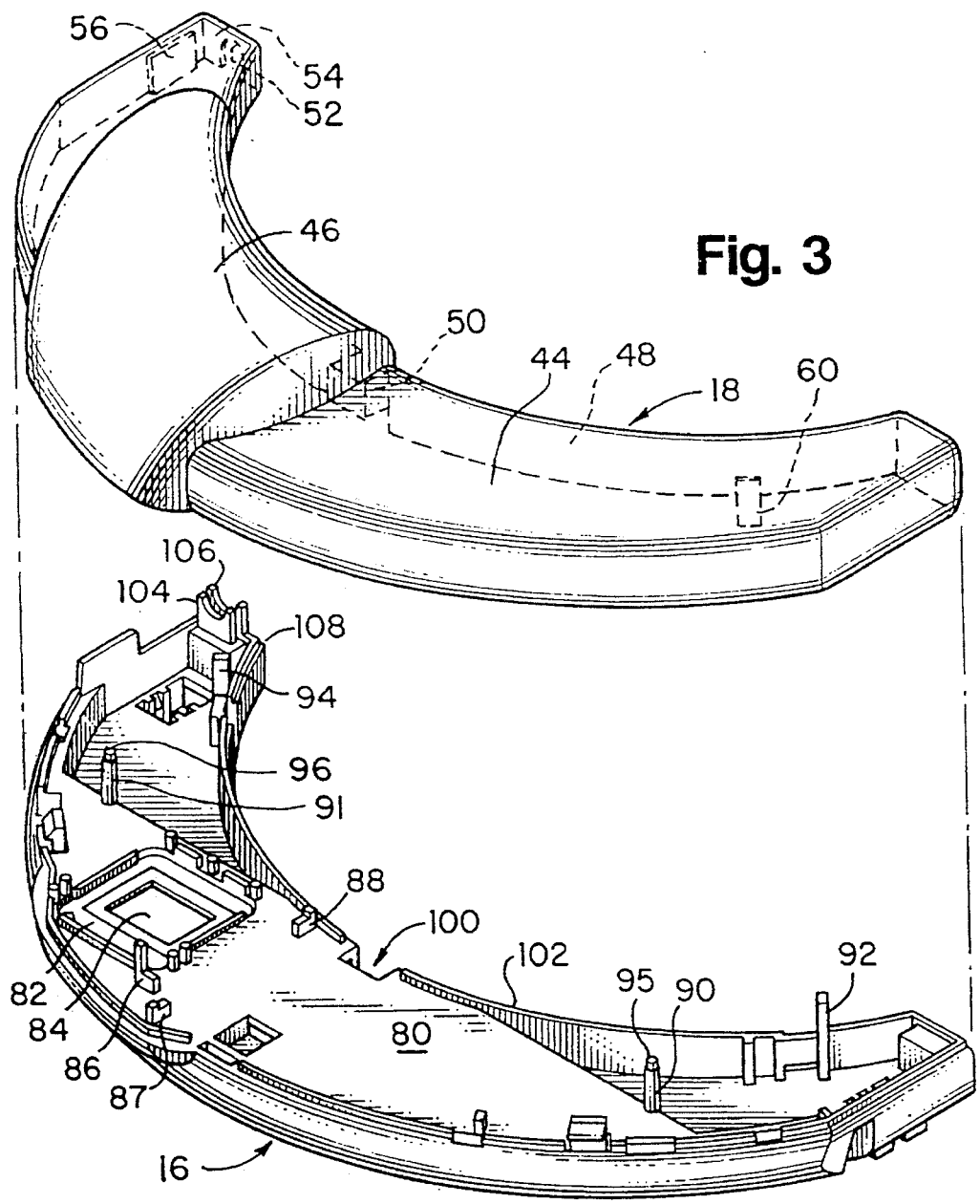
FIG. 3 is an exploded perspective view illustrating the frame cover and lens holder shown in FIG. 1.

The head mounted display system 10 of the present invention as shown in FIG. 1 includes a frame generally designated 12. The frame 12 includes a lens or transparency 14, a lens holder 16, a top cover 18, right and left temples 20 and 21 and a nose piece 24. The frame 12 supports a display 26 that may be formed of a miniature liquid crystal video display with or without a diffuser, diffractive grating, filter or lens. The display may be extremely small such as on the order of 0.6 inches by 0.9 inches but capable of generating a high resolution video image such as a T.V. image or computer generated image. The display 26 is mounted over an aperture 84 in the lens holder 16 so that the information depicted on the display 26 can be reflected by a single optical element 28. The optical element 28 has three distinct surfaces, an entrance surface S1 that receives video information from the display 26, an exit surface S3 wherein the user views the video image directly through the exit surface and a reflective surface S2 that reflects the video image from the entrance surface to the exit surface. The optical surfaces S1, S2 and S3 of the element 28 are shaped to generate a magnified virtual image of the displayed information at an apparent location a distance from the user that is substantially greater than the actual distance between the display 26, the reflective surface S2, and the user's eye. For example, the optical element 28 may generate a virtual image the size of which along a diagonal is between 10 inches at an apparent distance from the user of 2 feet and 80 inches at an apparent distance of 15 feet. However, the optical element is also shaped, as discussed in detail below, to minimize distortion, astigmatism and chromatic aberrations so as to provide a virtual image of high quality and resolution.

The head mounted display system 10 is modular in nature such that various components of the system 10 can be removed and replaced and/or adjusted so as to accommodate various users as well as various applications of the head mounted display system. For example, the optical element 28 is pivotally mounted in a support 30 so as to allow the optical path defined by the display 26, the optical element 28, and an eye of the user to be adjusted relative to a first axis which is the axis of rotation or axis about which the element 28 pivots. The support 30 and thus the optical element 28 may also be moved in a generally horizontal direction towards and away from the nose piece 24 to accommodate users having different interpupillary distances. The optical element 28 may also be adjustably mounted on the support 30 in a generally vertical direction so that a user can adjust the distance between the entrance surface of the optical element 28 and the display 26 to increase or decrease the apparent distance of the virtual image from the user. This spacing adjustment allows a user who normally wears glasses or contact lenses to adjust the optical system to fit his personal accommodation power when the user is not wearing his glasses or contact lenses. Thus such a user can adjust the system so that he can see the image without his glasses or contact lenses.

The nose piece 24 is also movably mounted relative to the lens holder 16 so as to allow the distance between a bottom surface 32 of the lens holder 16 and the user's nose to be varied to adjust the optical path defined by the relative positions of the display 26, optical element 28, and the user's eye relative to a second, generally vertical axis. The nose piece 24 is further completely removable from the frame 12 so that the head mounted display system 10 may be worn by a user wearing conventional glasses. More particularly, when worn by a person wearing glasses, the lens holder 16 rests on the frame of the glasses so that the nose piece of the glasses is in the same general position as the nose piece 24 would have been in if it had not been removed. Therefore, it is the nose piece of the conventional glasses that supports the frame 12 on the user when the nose piece 24 is removed.

The support 30 may be removed from the lens 14 so as to allow the optical system to be replaced. Further, because the support 30 is removably mounted on the lens 14, the lens 14 may be replaced without the need to replace the support 30 and optical element 28. More particularly, the lens 14 is removably mounted in a recess of the lens holder 16 so as to allow the lens 14 to be removed therefrom. This feature allows lenses or transparencies having various light transmissive or optical qualities to be mounted in the lens holder 16 and to be used with a single optical element 28 and support 30. For example, for indoor use, it is generally desirable to have a lens that is clear whereas for use outdoors, a tinted lens might be preferable. Alternatively, the use of a darker lens will offer the user the perception of a brighter display; the ability to match the display illumination level with his external view or to use the display optic with his nondominant eye. Because the lens 14 and support 30 are removable, the different lenses may be used with the same lens holder 16, support 30, and optical element 28 so as to make the head mounted display system 10 flexible and accommodate various applications.

Each of the temples 20 and 21 includes a respective hinge 34, 35 that exerts a force on the temples 20, 21 to direct the temples inward so that they hug the user's head. The hinges are removable so that hinges of various flexibility can be employed with the system 10 to allow the system to be worn more comfortably by users having large differences in head sizes. Further, the system 10 may include one or more earphones 38, 39. Each of the earphones 38, 39 is connected to a circuit contained within the cavity formed by the lens holder 16 and top cover 18 via wires 40, 41 and electrical connectors that fit into respective electrical jacks disposed on a bottom surface of the lens holder 16, as discussed below. The wires 40, 41 are retained adjacent to the temples 20, 21 by hooks formed integrally with the hinges 34, 35. The wires 40, 41 are removable from the hooks of the hinges 34, 35 and the earphone connectors are removable from the jacks in the lens holder 16 so as to enable the earphones 38, 39 to be removed from the display system 10 and replaced. Further, the earphone retainers 36, 37 are removably mounted on the respective temples 20, 21 so that they may also be removed from the system 10. The removable earphone retainers and earphones allows a user to utilize different earphones that are connectable with the earphone jacks of the system 10.

The top cover 18 and lens holder 16 are shown in detail in FIGS. 3–6. The top cover 18 has a top profile with a crescent-like shape and a generally flat top surface 40. A slight housing extension 46 is formed in the top surface 44 to accommodate the display 26. An inner surface 48 of the top cover is formed with a rectangular recess 50 therein so as to receive an upwardly extending member 231 of the nose piece 24, as described in detail below, such that an outer surface of the nose piece member 231 received in the recess 50 is flush with the inner surface 48 of the top cover. A generally arcuate opening 52 is formed in an end 54 of the top cover 18 to accommodate an electrical connector that mates to an electrical connector carried on an end of a single wire that couples video, audio, and power from a portable interface unit to the display 26 and circuitry contained in the housing formed by the top cover 18 and lens holder 16. The circuitry contained in the housing formed by the top cover 18 and lens holder 16 as well as the portable interface unit are disclosed in detail in U.S. patent application Ser. No. 07/793,155, filed Nov. 6, 1992, entitled PORTABLE VIDEO DISPLAY SYSTEM, and assigned to the Assignee of the present invention, and in U.S. patent application Ser. No. 07/986,422, filed Dec. 4, 1992 entitled HEAD MOUNTED VIDEO DISPLAY SYSTEM WITH PORTABLE VIDEO INTERFACE UNIT, and also assigned to the Assignee of the present invention. Each of these applications is incorporated herein by reference.

A recess 56 is also formed in an outer sidewall 58 of the top cover 18 so as to accommodate a brightness control knob or other control input for the display system. However, if desired, the brightness control input may be disposed on the portable interface unit. The top cover 18 includes four symmetrically disposed hooks, only three of which, 60, 61, and 62, are shown to secure the top cover 18 to the lens holder 16. The hooks 60 and 61 extend downwardly from an inner sidewall 64 of the top cover 18 such that an outer surface 66 of the hooks 60, 61 is flush with the surface 48 of the top cover. Each of the hooks 60, 61, and 62 is formed with a protrusion 68 that extends in towards the cavity 70 of the top cover 18. The two hooks 62 symmetrically disposed on an outer sidewall 72 of the top cover are such that the lower edge of the hooks 74 is flush with a lower edge 76 of the sidewall 72.

The lens holder 16 has a generally crescent-shape so that the outer walls of the lens holder 16 conform to the outer walls of the top cover 18. The lens holder 16 supports on a top surface 80 thereof the display 26 and lower and upper printed circuit boards, not shown. More particularly, the top surface 80 is formed with a slight recess 82 therein that is generally square or rectangular in shape to mount the display 26. The recess is formed with a centrally located, generally rectangular aperture 84 over which is placed the face of the display 26 so that the displayed information can be received by the mirror 28. A number of short ribs such as 86, 87, and 88 extend upwardly from the top surface 80 of the lens holder 16 so as to support a lower printed circuit board thereon. The lower printed circuit board includes at least one hole through which a boss 90 extends when the lower printed circuit board is mounted on the lens holder 16. The boss 90, a second boss 91, and a pair of large ribs 92 and 94 are symmetrically disposed about the top surface 80 of the lens holder 16 so as to support the upper printed circuit board. The upper printed circuit board includes a pair of holes that are smaller in diameter than the diameter of the respective bosses 90, 91, but which are large enough to receive therein pins 95 and 96 extending upwardly from respective bosses 90, 91. When the upper printed circuit board is mounted on the lens holder 16, the board rests on the ribs 92, 94, as well as on the upper surfaces of the respective bosses 90, 91 with the pins 95, 96 extending through the holes in the upper printed circuit board.

The lens holder 16 includes an indentation 100 that is formed in an innerwall 102 thereof, such that the indentation 100 is aligned with the recess 50 of the top cover 18 when the top cover 18 is mounted on the lens holder 16. When the top cover 18 is mounted on the lens holder 16, the indentation 100 forms an aperture through which a flange 246 on the nose piece 24 extends so as to mount the nose piece 24 on the frame 12. A pair of upwardly extending ribs 104 and 106, having an arcuate upper surface, are disposed in an end 108 of the lens holder 16 so as to be aligned with the arcuate opening 52 formed in the top cover 18 when the top cover 18 is mounted on the lens holder 16. The ribs 104 and 106 support the electrical connector that mates with the connector coupled to the end of the single wire providing the video, audio, and power from the portable interface unit to the display 26 and lower and upper printed circuit boards.

Figure 4:
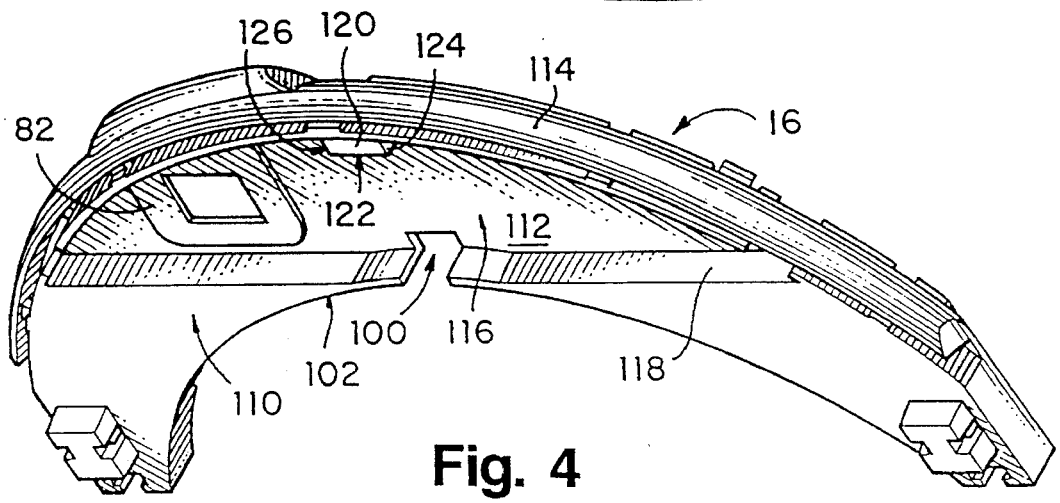
FIG. 4 is a bottom perspective view of the lens holder depicted in FIG. 3.
Figure 5:
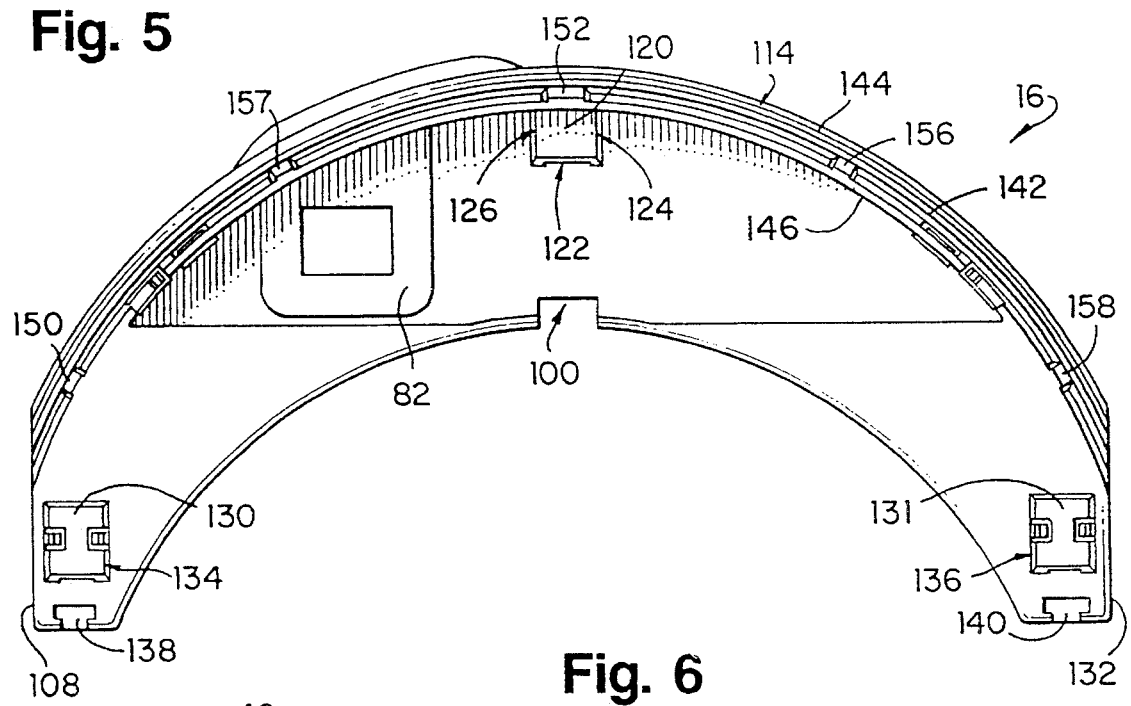
FIG. 5 is a bottom view of the lens holder depicted in FIG. 3.
Figure 6:
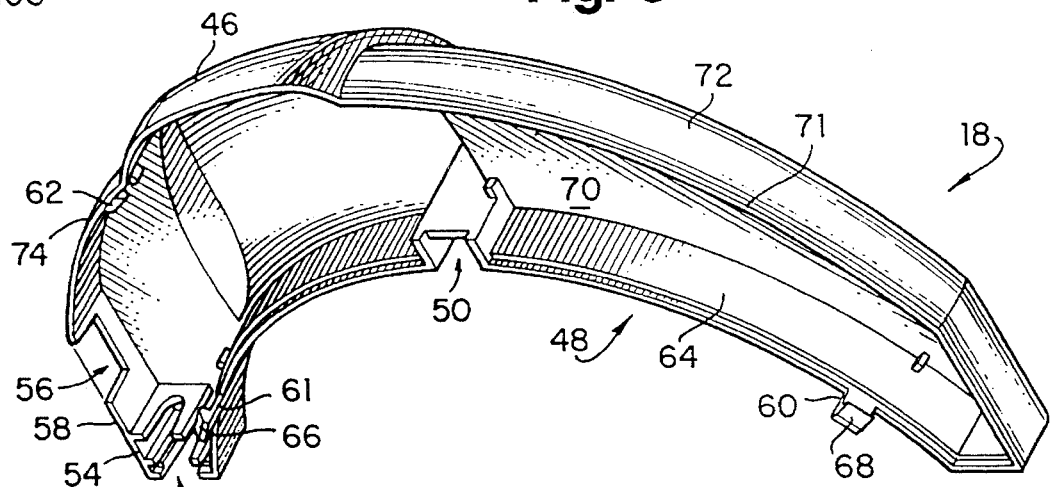
FIG. 6 is a bottom perspective view of the frame cover depicted in FIG. 3.

As shown in detail in FIGS. 4 and 5, the lens holder 16 has a generally flat bottom surface 110 with a longitudinally extending recess 112 formed therein. The recess 112 extends substantially the length of the front of the lens holder so as to be able to receive therein the upper edge of the frame of a pair of conventional glasses when the nose piece 24 is removed from the display system 10. More particularly, when the display system 10 is worn by a user also wearing a pair of glasses, the surface 116 of the recess 112 rests on the upper edge of the frame of the glasses so that the display system 10 is supported by the glasses frame, and in particular, by the nose piece of the glasses. The recess 112 is positioned in the bottom surface 110 of the lens holder 16 so that when supported on a pair of glasses, the nose piece of the glasses is in substantially the same position that the nose piece 24 would be if not removed from the frame 12. It is noted that although the recess 112 is shown extending to the outer sidewall 114 of the lens holder 16, it need not extend so far, but only enough to receive the upper edge of a frame of a pair of glasses wherein at least a portion of the recess 112 is between an innerwall 118 and/or the inner sidewall 102 of the lens holder 16 and the aperture 84 for the display 26.

A hollow box-shaped member 120 is formed in a central location on the bottom surface 110 of the lens holder 16, and in particular, in the recess 112 adjacent to the outer sidewall 114 of the holder 16 so as to receive a member 244 of the nose piece 24, as described in detail below. More particularly, the box member 120 includes an aperture 122 formed between a pair of sidewalls 124 and 125 where the aperture 122 is aligned with the indentation 100. When the nose piece 24 is mounted on the frame 12, one flange 244 of the nose piece 24 extends through the aperture 122 into the box member 120, whereas a second flange 246 extends through the aperture formed by the indentation 100 into the cavity or housing formed by the top cover 18 and lens holder 16, so as to removably mount the nose piece 24 on the frame 12.

A pair of earphone jack mounting members 130 and 131 are integrally formed on the bottom surface 110 of the lens cover 116 adjacent respective ends 108 and 132 of the lens holder 16. The earphone jack mounting members 130, 132 extend downwardly from the bottom surface 110 of the lens holder 16, and each member 130, 131 includes a respective aperture 134, 136 so as to allow an earphone connector to be inserted therethrough for connection with the jack mounted in the members 130, 131. The ends 108 and 132 of the lens holder 16 are also formed with respective T-shaped apertures therein, 138 and 140, so as to receive and movably mount the respective T-shaped ends of the respective hinges 34 and 35, as discussed in detail below.

The outer sidewall 114 of the lens holder 16 is formed with a longitudinally extending recess 142 that extends substantially the length of the outer sidewall 114 between an inner surface 144 of the outer wall 114 and an innerwall 146, wherein the recess 142 receives the lens or transparency 14 of the frame 12. Five ribs are symmetrically disposed in the recess 142 formed between the outer wall 114 and innerwall 146 so as to engage hooks formed on the lens 14 in order to maintain the lens 14 in place on the frame 12.

Figure 7:
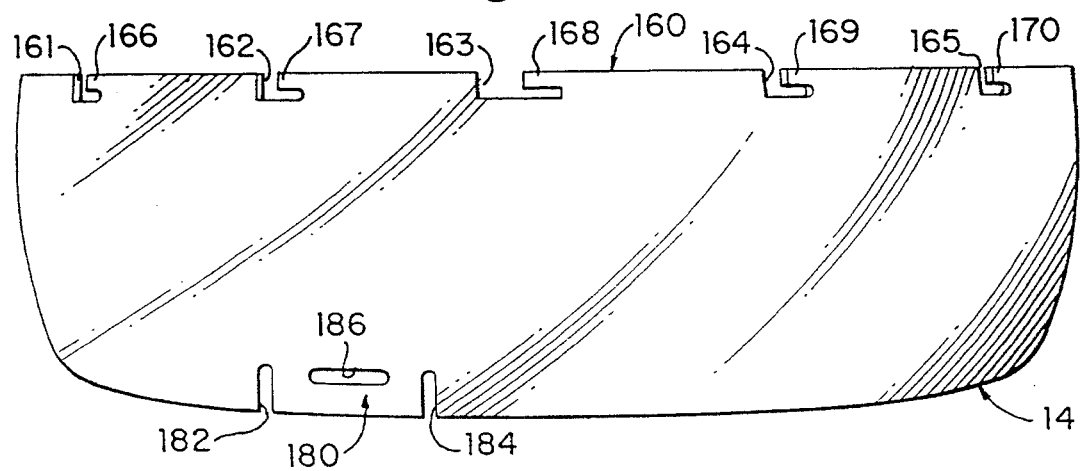
FIG. 7 is a front view of a lens depicted in FIG. 1.

More particularly, the lens 14 as shown in FIG. 7 includes, adjacent an upper edge 160 thereof, five L-shaped indentations 161–165 so as to form five hook members 166–170 in the lens The hook members 166–170 are symmetrically disposed along the upper edge 160 of the lens 14 and are spaced in accordance with the spacing of the ribs 150, 151, 152, 156, and 158, so as to engage an upper surface of the ribs to mount the lens 14 on the lens holder 16. The hook members 166–170 of the lens 14 all extend in the same direction so that the lens may be mounted on the lens holder 16 by sliding the lens 14 in the recess 142 to the left, or by reversing the lens 14 and sliding the lens in the recess 142 to the right. It is noted, because the hooks 166–170 of the lens 14 and the ribs 150, 151, 152, 156, and 158 of the lens holder 16 are symmetrical, the lens 14 may be mounted with a mirror mounting surface generally designated 180 on the right side or the left side of the display system. The lens mounting surface 180 includes a pair of upwardly extending slots 182 and 184 that receive therein respective sidewalls of the mirror support 30. Further, the mirror mounting surface 180 of the lens 14 includes a slot 186 that extends horizontally between the upwardly extending slots 182 and 184. The horizontally extending slot 186 receives a protrusion formed on the mirror support 30, as described in detail below, so as to maintain the mirror support 30 securely on the lens 14.

It is noted that the lens 14 may be formed of a lightweight plastic, or the like, that is flexible or bendable so that the lens, when mounted in the recess 142, conforms to the arcuate shape of the recess, as shown in FIG. 1. Further, the lens 14 may be formed with different diopters so as to accommodate people that are slightly near-sighted or far-sighted for example. Although the lens 14 is shown in FIG. 7 as a single lens, the lens 14 may be split into two lenses, one covering the right side of the display system, and the other covering the left side of the display system, if desired. The lens 14 may also be tinted for outdoor use, for example, or the lens 14 may be clear for indoor use. Because the lens is removably mounted on the lens holder 16, the lens 14 can easily be changed to suit a particular application of the display system 10.

The optical element 28 in accordance with one embodiment of the present invention, as shown in FIG. 8A, includes an entrance surface S1 for receiving the video image directly from the display 26. A reflective surface S2 reflects the video image from the entrance surface S1 to the exit surface S3 of the optical element 28. The reflective surface S2 may reflect by total internal reflection or by applying a reflective coating to the surface. The exit surface S3 faces the user's eye when the optical element 28 is positioned correctly on the head mounted display system 10 to allow the user to view the video image directly through the exit surface S3.

In the preferred embodiment, the reflective surface S2 is curved so as to contribute to the total magnifying power of the optical element 28. For a given radius of curvature, approximately four times as much magnifying power is obtained from curving the reflective surface S2 as is obtained from curving either of the refractive surfaces S1 and S3. Therefore, by adding a slight curvature to the reflective surface S2, the curvature of, and thus the magnifying power contributed by, each of the refractive surfaces S1 and S3 may be significantly reduced. Further, by reducing the magnifying power of the refractive surfaces S1 and S3, chromatic aberrations of the optical element 28 are reduced. The reflective surface S2 may be, for example, a concave spherical surface with a radius of curvature approximately 252 mm.

Figure 13:
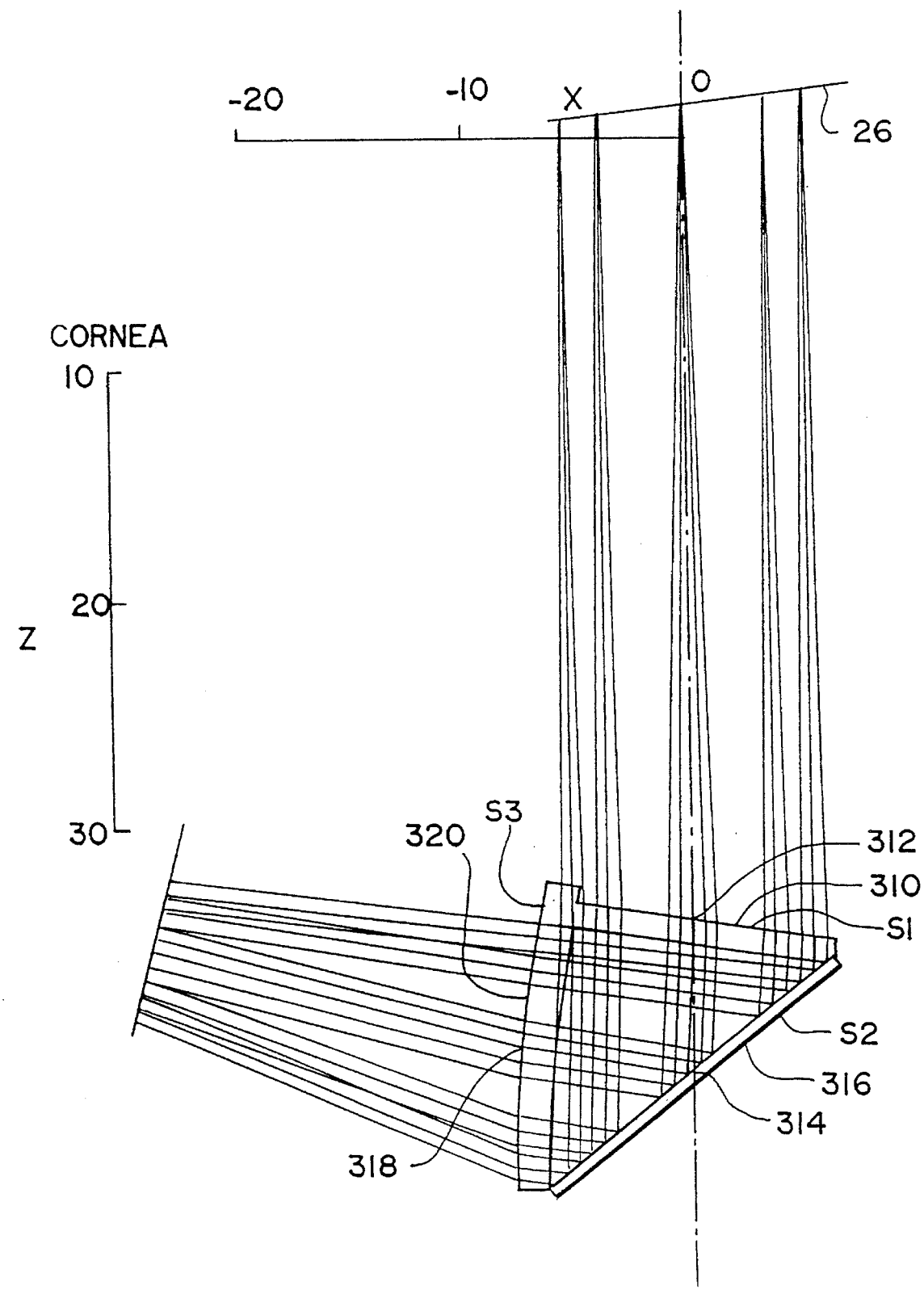
FIG. 13 is a ray tracing of the optical system.

When the reflective surface S2 is formed as a curved surface, an astigmatism is introduced. In order to correct for this astigmatism, the entrance surface S1 is made cylindrical so as to introduce an astigmatism that cancels the astigmatism introduced by the reflective surface S2. The cylindrical entrance surface S1 is convex and has a radius of curvature of approximately 62 mm. As shown in FIG. 13, the axis of a hypothetical cylinder having the surface S1 would extend generally parallel to the line 310 with the radius of curvature extending from that axis to the surface S1.

The exit surface S3 of the optical element is formed so as to principally control the field of view, i.e., the size of the virtual image that is projected by the optical element 28 at a given focal length. The exit surface S3 also controls the location of the virtual image with respect to the user. In the preferred embodiment, the exit surface S3 is convex spherical with a radius of curvature of 54.6 mm.

FIG. 13A illustrates a ray tracing of the optical element 28 generated by a software package "Beam 4 Optical Ray Tracer" by Stellar Software and using techniques described in the text "Elements of Modern Optical Design", 1985, Donald C. O'Shea, published by John Wiley and Sons, Inc. This ray tracing is helpful to more completely describe the configuration of each of the surfaces S1, S2, and S3. As previously described, the entrance surface S1 is a cylindrical surface having a radius of curvature of 62 mm. The X, Y, and Z axis coordinates of the vertex 312 of the entrance surface S1 are: X=0, Y=0, and Z=34.167 mm. The entrance surface S1 has a pitch of −7° so that the line 310 in FIG. 13 that extends through the vertex 312, is 7° in the clockwise direction from a line that is parallel to the X axis and that also extends through the vertex 312. If one looks at the entrance surface S1 from the position of the display 26, the surface S1 is approximately 13 mm high and 25.4 mm wide.

The reflective surface S2, as described above, is a spherical surface having a radius of curvature of 252 mm. The X, Y, and Z axis coordinates of the vertex 314 of the reflective surface S2 are: X=0, Y=0, and Z=41,167 mm. The reflective surface S2 has a pitch of 37.9523° so that the line 316 of the surface S2 extending through the vertex 314 is 37.9523° in a counterclockwise direction from a line parallel to the X axis and that also extends through the vertex 314. If one looks at the back of the reflective surface S2 towards the direction of the display 26, the reflective surface S2 is 25.4 mm wide and 16.8 mm high.

The spherical exit surface S3 has a radius of curvature of 54.6 mm, as described above. The X, Y, and Z axis coordinates of the vertex 318 of the exit surface S3 are X=−7.727 mm, Y=0, and Z=39.096 mm. The exit surface S3 has a pitch of 83.5° so that the line 320 of S3 extending through the vertex 318 is approximately 83.5° in the counterclockwise direction from a line that is parallel to the X axis and that also extends through the vertex 318. If one looks towards the surface S1, as if the optical element 28 were installed in the head mounted display system 10, the surface S3 is approximately 25.4 mm wide and 13.4 mm high. It is further noted that in FIG. 13 the display 26 is tipped 7° in the counterclockwise direction with respect to the depicted X axis. A 75° angle of view is provided by the optical system shown in FIG. 13. The angle of view represents the angle between a line extending from zero on the X axis to the vertex 314 of surface S2 and a second line extending from the vertex 314 to the vertex of the cornea.

The optical element 28 shown in FIG. 8A for the head up display system 10 essentially eliminates distortion, astigmatism and chromatic aberrations perceived by a user in viewing a video image such as a movie. More particularly the normalized longitudinal axial chromatic aberration, $\overline{L}_{CH}$, of the image on the retina of an emmetropic eye generated by the element 28 is less than 58 microns and preferably less than 29 microns. $\overline{L}_{CH}$ may be thought of as the depth of the chromatic aberration. The transverse axial chromatic aberration, $T_c$, of the image on the retina of an emmetropic eye generated by the element 28 is less than 28 microns and is preferably less than 14 microns. $T_c$ may be thought of as the height of the chromatic aberration. The F number of the system, the ratio of the effective focal length to 2 times the radius of the limiting aperture (in this case the user's pupil), is F=6.8 to 13. The distortion of the image on the retina of an emmetropic eye generated by the optical element in the Z - X plane is −0.053 and in the Z - Y plane is +0.04 where the X, Y and Z planes are not as shown in the ray tracing of FIG. 13 but are defined in accordance with typical optical convention such that the Z axis is generally parallel to the axis labeled X in FIG. 13 and the Y axis is generally parallel to the axis labeled Z in FIG. 13. The distortion in the Z - X plane may be made approximately equal to the distortion in the Z - Y plane and less than 1% by configuring the surface S1 as a toric as opposed to a cylindrical surface. Further, by configuring the surface S1 as a toroidal surface, the field of curvature of the image in the X - Y plane may be made approximately equal to the field of curvature in the Z - X plane and each radius approaching infinity.

The optical element 28 shown in FIG. 8A and thus described, will generate a virtual image that appears to be approximately 48 inches wide and 32 inches high at a location that is approximately 10 feet from the user. It is noted that the size of the virtual image at a given distance from the user may be increased by adding more magnifying power to one or more of the three surfaces S1, S2, and S3 of the optical element; however, chromatic aberrations may result with increases in the magnifying power of the surfaces. In the preferred embodiment, the optical element 28 is formed of a solid block of material such as an acrylic, PMMA (poly-methylmethacrylate) which has a low chromatic dispersion. The optical element 28 may be machined to provide the desired curvatures of surfaces S1, S2 and S3. Alternatively, the optical element 28 may be formed by injection molding. A knob 208 extends from each side 210 of the optical element 28 so as to allow the element 28 to be mounted in the support 30, described below.

The support 30 for the optical element 28 of FIG. 8A is shown in detail in FIGS. 8B–10. The support in this embodiment includes a frontwall 190 that extends across the support 30 between a pair of sidewalls 192, 194. A backwall 196 also extends between the sidewalls 192, 194. The backwall 196 is spaced from the frontwall to form a recess 198 therebetween so that the mirror support mounting portion 180 of the lens 14 can be received in the recess 198. As shown in FIG. 10, the frontwall 190 includes a longitudinally extending protrusion or hook that extends from the back surface of the frontwall towards the backwall 196. When the support 30 is mounted on the lens 14, shown in FIG. 7, sidewalls 192 and 194 are respectively received in the slots 182 and 184 of the lens 14, and the protrusion 200 is received in the slot 186 of the lens so as to removably mount the support 30 on the lens 14.

The support 30 also includes a pair of arms 202 and 204 that extend from opposite sides of the backwall 196 in a direction away from the frontwall 190. Each of the arms 202, 204 includes an aperture 206 for receiving therein respective knobs 208 on opposite sides 210 of the optical element, so as to removably mount the optical element 28 in the support 30. It is noted that this mounting of the optical element 28 in the support 30 allows the optical element 28 to be rotated about an axis that extends generally through the center of the knobs 208, so that a user can adjust the optical path defined by the display 26, the optical element 28, and the user's eye. Because the lens 14 on which the support 30 is removably mounted is curved, the support 30 is shaped with a varying cross section such that the arm 202 extends inwardly towards the user's face from the backwall 196, a greater distance than the arm 204. Therefore, when the optical element 28 is mounted in the aperture 206 of the respective arms 202 and 204, the optical element 28 is in a position such as shown by the dotted line 206 of FIG. 10, wherein the axis of the element 28 extending between the centers of the knobs 208 is not parallel to the backwall 196 of the support 30, but is at an angle thereto. However, this mounting does allow the axis 212 of the optical element 28 to be generally parallel to the user's face for easy viewing. Because the support 30 can be removed from the lens 14, the lens 14 may be changed so as to accommodate the various environments in which the display system 10 is used without the need for replacing the optical element 28 and support 30 also.

Figure 14:
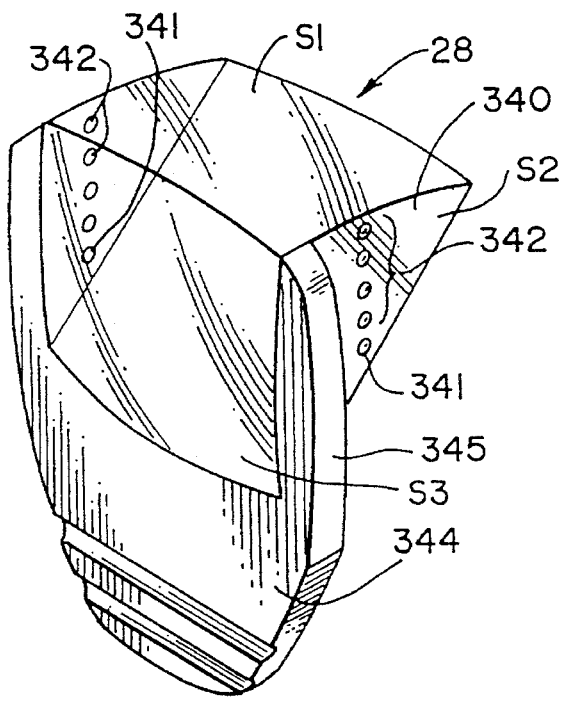
FIG. 14 is a perspective view of a modified optical element that is movable with respect to a support for varying the focal length of the optical system.

In a second embodiment of the optical element 28, the mounting knobs 208 extending from the opposite sides 210 of the optical element 28, as shown in FIG. 8A, are removed. In this alternate embodiment, as shown in FIG. 14, the optical element 28 includes, on each of its sides 340, a plurality of tiny apertures or detents 342 that are aligned in a row that extends generally parallel to the edge of the exit surface S3 abutting the sidewall 340. Each aperture on one sidewall 340 of the optical element 28 has an associated aperture on the opposite sidewall of the optical element 28 to form a pair of apertures that are in the same horizontal plane such as the aperture pair 341.

Figure 16:
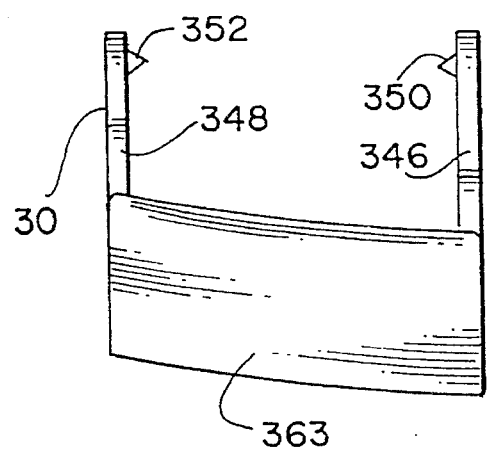
FIG. 16 is a front view of the modified support of FIG. 15.
Figure 15:
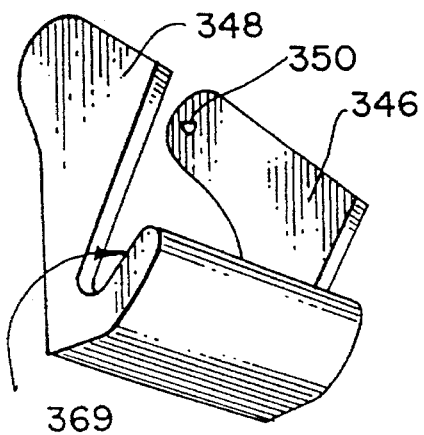
FIG. 15 is a perspective view of a modified support for the optical element illustrated in FIG. 14.
Figure 17:
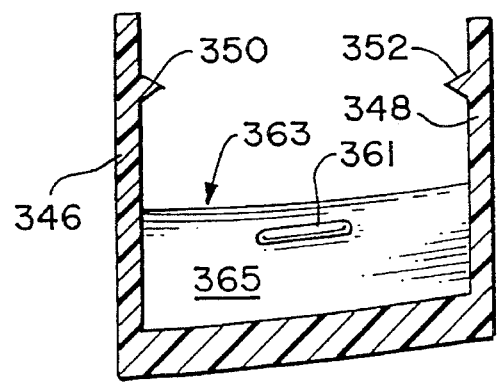
FIG. 17 is a back cross sectional view of the support shown in FIGS. 15 and 16.

The support 30 for the optical element shown in FIG. 14 is also modified as shown in FIGS. 15–17. The modified support 30 does not include the apertures 206 in the arms 202 and 204, but includes solid arms 346 and 348. Each of the arms 346 and 348 includes a small cone-shaped protrusion 350, 352 that extends inwardly from the respective arm 346, 348 towards the optical element 28. The modified optical element 28 of FIG. 14 is mounted on the modified support 30 of FIGS. 15–17 by inserting the protrusions 350, 352 into a pair of horizontally-aligned apertures 342. As further shown in FIG. 14, the modified optical element 28 may have a plastic finger tab 344 mounted thereon such that the tab 344 extends downwardly from the optical element 28. When the head mounted display system 10 with the modified optical element 28 is worn by a user, the user can adjust the distance between the entrance surface S1 and the display 26 by pulling down on the finger tab 344 or by pushing up thereon so as to cause the protrusions 350, 352 to engage different pairs of horizontally-aligned apertures 342. The apertures 342 in the modified optical element 28 allow the distance between the entrance surface S1 and the display 26 to be adjusted over a range of 5 mm. This focal length adjustment allows the location of the virtual image to be varied with the apparent distance of the virtual image from the user ranging from 2 feet to 40 feet. It is noted that although the focal length, i.e. the distance from S3 to the apparent location of the image remains approximately 50 mm, as the optical element is moved vertically closer to the display, the user's eye adjusts to perceive the image as moving closer. This is because, as the distance between the optical element 28 and the display is changed, the exit ray angle, i.e. the angle of the rays leaving S3, changes so that the focal length of the whole system including the display, the optical element 28 and the lens of the user's eye changes. It is further noted that as the modified optical element 28 is moved towards and away from the display 26 so as to vary the apparent distance of the virtual image from the user, the size of the virtual image increases/decreases as the apparent distance of the virtual image from the user is increased/decreased.

The apertures 342 may be formed on the optical element 28 as shown or on a portion of the finger tab 344. In the latter instance the upper sidewalls 345 of the tab 344 would be enlarged to extend past the position of the apertures shown in FIG. 14. This modification would enable apertures formed on the finger tab sidewalls 345 to be located at the same distance from the exit surface S3, as shown in FIG. 14. Further, instead of individual apertures 342, a longitudinal groove may be formed in the optical element or finger tab sidewall at the same distance from the exit surface, as shown for the apertures 342. This longitudinal groove would allow infinite vertical adjustments within a given range to be made. In this embodiment the protrusions 350, 352 of the modified support 30 of FIG. 16 would preferably be wedge-shaped. The wedge-shaped protrusions and arms 348 and 350 of the support 30 would exert a spring force on the optical element to maintain the element 28 in position on the support 30, but they would allow the optical element to be moved closer or further away from the display 26 to vary the apparent location of the virtual image from the user, as discussed above.

Figure 18:
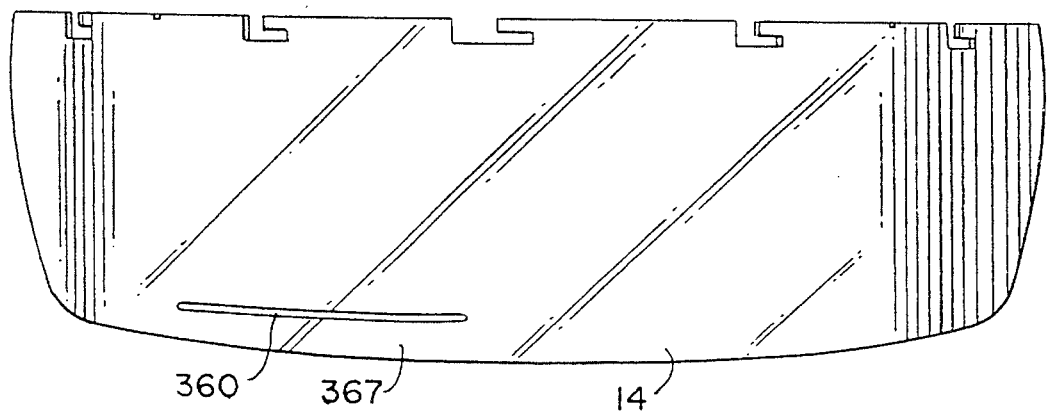
FIG. 18 is a front view of a lens modified so as to accommodate the support shown in FIGS. 15–17.

The modified support 30 shown in FIGS. 15–17 may be mounted on a modified lens 14, as shown in FIG. 18, so as to allow the user to move the modified support 30 and optical element 28 horizontally towards and away from the nose piece 24. This horizontal movement allows the head mounted display system 10 to accommodate users having very different interpupillary distances. More particularly, the modified lens 14 includes a horizontally-extending slot or indentation 360. A longitudinal, i.e., horizontally-extending, protrusion 361 extends from the back surface 365 of the front wall 363 of the modified support 30. This protrusion extends into the slot or indentation 360 of the modified lens to allow the support 30 of FIGS. 16–17 to be guided along the slot 360 towards and away from the nose piece 24. As modified support 30 is slid relative to the lens 14 of FIG. 18, the lens bottom 367 moves through respective slots 369 in the arms 346 and 348 of the modified support 30.

It is noted that because the optical element 28 floods the eye with the ray bundle representing the virtual image such that the diameter of the ray bundle is greater than the diameter of the user's pupil, fine horizontal adjustments to the optical element 28 to account for variations in the interpupillary distance between various users need not be made. The adjustment for variations in the interpupillary distance provided by the slot 360 in the modified lens 40 provides a gross adjustment to enable the head mounted display system 10 to accommodate people with large variations in their interpupillary distance.

Figure 19:
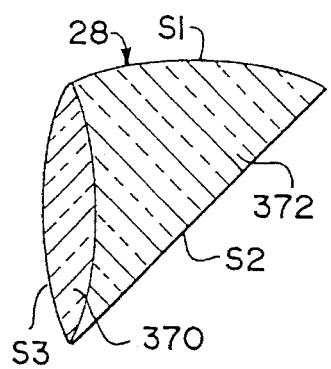
FIG. 19 is a cross section of a further embodiment of an optical element in accordance with the present invention.
Figure 20:
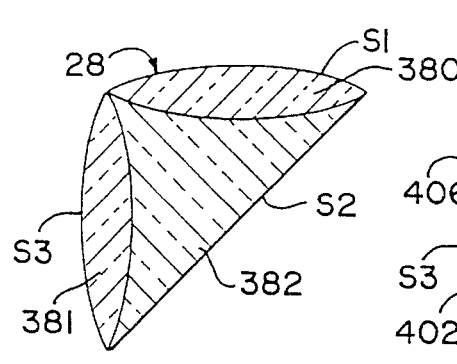
FIG. 20 is a cross section of still another embodiment of an optical element in accordance with the present invention.

The optical elements 28 shown in FIG. 8A and FIG. 14 are made of a single material, such as PMMA. The optical element 28 can be modified, however, to be made of two or more different materials so as to provide an achromatic optical element. More particularly, as shown in FIG. 19, the exit surface S3 is formed on a thin positive lens 370 of a material having a low index of refraction, for example 1.49, and an ABBE value of 61.93, such as for PMMA. The remaining bulk 372 of the optical element may be formed of a material having a higher index of refraction, for example 1.585, and an ABBE value of 31.0 such as for polystyrene. Other materials suitable for the portion 372 of the optical element include a polycarbonate and a metho-methacrylate-styrenecopolamer. By selecting the proper ratios of the magnification powers of the surfaces S1, S2, and S3, the thickness of each comoponent, as well as the index of refraction of each component, the optical element 28 can be formed into a chromatic doublet contributing minimal chromatic aberrations. Similarly, as shown in FIG. 20, the entrance and exit surfaces S1 and S3 may both be formed on a respective thin, positive lens 380, 381 made of PMMA. The lenses 380 and 381 may then be bonded to a negative lens 382 of polystyrene to form the optical element 28 with minimal chromatic aberrations. Alternatively, the lenses 380, 381 and 382 may be made of three different materials to form a Cooke triplet.

Figure 21:
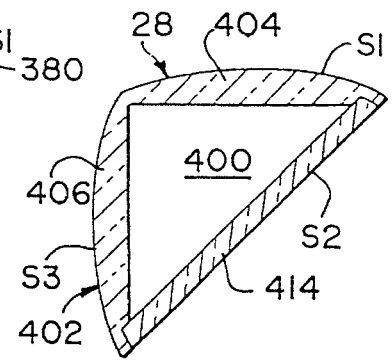
FIG. 21 is a cross section of a first embodiment of a hollow optical element in accordance with the present invention.
Figure 22:
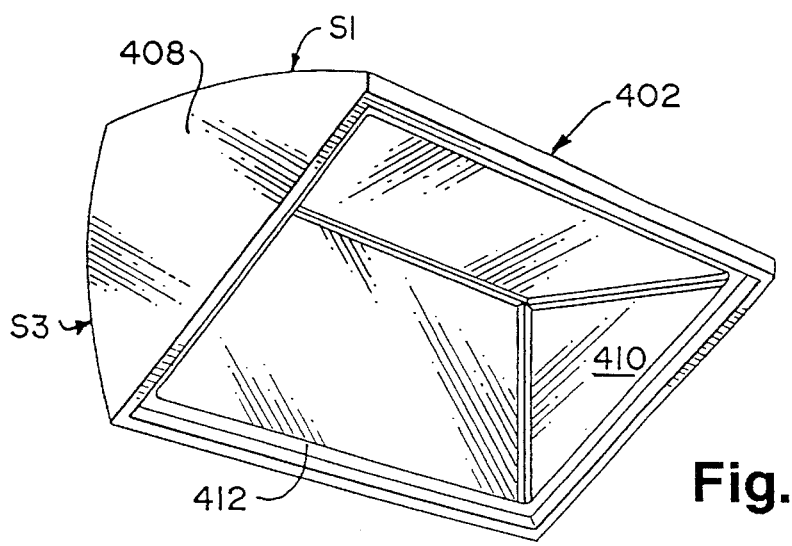
FIG. 22 is a back view of the optical element depicted in FIG. 21 with only a partial view of the reflector being illustrated.

FIGS. 21 and 22 illustrate another embodiment of the optical element 28 in accordance with the present invention. In this embodiment, the optical element 28 is hollow, the element having an air-filled cavity 400. The optical element 28 shown in FIGS. 21–22 is formed in two parts 402 and 414. A first part generally designated 402 includes a thin lens portion 404 on which the entrance surface S1 of the optical element 28 is formed. The part 402 also includes a second lens portion 406 on which the exit surface S3 is formed. The part 402 of the optical element also includes a pair of sidewalls 408 and 410 that are integrally formed with the lens portions 404 and 406. As shown in FIG. 22, a ledge 412 is formed at the back of the part 402 so as to provide a mounting surface for a mirror 414 that forms the reflective surface S2. Because the walls of the lens portions 404 and 406 are very thin, the part 402 may be easily formed by injection molding techniques. The optical element 28 shown in FIG. 21 can be such that the entrance lens portion 404 and the exit lens portions 406 are made of two different materials to form an achromat. Further, either or both of the individual lens portions 404 and 406 can be formed of two different materials such that the individual lens portion 404, 406 is an achromat.

It is noted that the surfaces S1, S2, and S3 of the optical elements shown in FIGS. 19–23 may be formed such that the entrance surface S1 is a cylindrical or toroidal surface and the reflective surface S2 and exit surface S3 are spherical surfaces, as described above. Alternatively, the reflective surface S2 may be made flat and the refractive surfaces S1 and S3 may be made spherical with increased magnification powers to account for the loss of magnification resulting from the surface S2 being made flat. In still another embodiment, the entrance surface S1 may be made flat, as well as the reflective surface S2, wherein the exit surface S3 is the only curved surface of the optical element.

FIGS. 23–27 illustrate a further embodiment of the hollow optical element 28 in accordance with the present invention. This hollow optical element 28 includes an entrance lens 452 or 456 on which the entrance surface S1 is formed. The optical element 28 shown in FIG. 23 also includes an exit lens 454 or 458 on which the exit surface S3 is formed. The entrance lens 452, 456; exit lens 454, 458; and a reflector 453 are fixedly supported in a mounting fixture 460 so as to form a single integral optical element 28.

As shown in more detail in FIGS. 26 and 27, the mounting fixture 460 includes a front portion 461 having a pair of sidewalls 464 and 465 with a bottom wall 468 extending between the sidewalls. It is noted that although the sidewalls 464 and 465 are generally triangular and extend across the entire sides of the optical element 28, the bottom wall 468 is relatively small so that it merely forms a base for a slot 463 in which the exit lens 454, 458 is positioned and a base for a slot 486 into which the bottom portion 470 of the reflector 453 is positioned. More particularly, the slot 463 for the exit lens is formed between a pair of U-shaped outer and inner ribs 460 and 462. The top surface 466 of the U-shaped inner rib 462 does not extend to the height of the outer rib 460 so that a ledge portion 466 is formed on the inner rib 462. The ledge 466 supports the periphery of the entrance lens 452, 456 when mounted on the fixture 460. The portion 480 of the fixture 460 in which the mirror 453 is mounted is U-shaped (in a manner similarly to the front portion 461 of the fixture 460) with inner and outer ribs 482 and 484 formed therein. The portion 480 of the fixture 460 is at a predetermined angle with respect to the front portion 461 of the optical element 28 so as to fix the angle between the reflective surface S2 and the exit surface S3. The ribs 482 and 484 of the reflector mounting portion 480 are spaced so as to provide a slot 486 therebetween wherein the ribs 482 and 484 engage three peripheral sides of the reflector 453. After the entrance lens is inserted into the slot 463 of the fixture 460, and after the reflector 453 is inserted into the slot 486 of the fixture 460, the entrance lens is positioned on the ledge 466 wherein a ledge 466 may extend from the front of the optical element to the back thereof on each of the sidewalls 464 and 465. Alternatively only partial ledge supports need be provided.

As shown in FIG. 24, the reflector 453 is preferably a flat reflector; whereas both the entrance lens 452 and the exit lens 454 are curved so as to form spherical lenses or the like that each contribute to the magnification power of the optical element 28. In an alternative embodiment illustrated in FIG. 25, the entrance lens 456 may be formed of a flat piece of glass and the exit lens may be curved so as to include all of the magnification power of the optical element 28. It is further noted that each of the sidewalls 464 may be provided with a knob 465 for mounting in the support 30 of FIG. 8B. Alternatively the sidewalls 464 may be provided with apertures 342 so that the element of FIG. 23 may be mounted in the modified support 30 shown in FIGS. 15–17.

As shown in FIGS. 28–30, the nose piece 24 includes a nose bridge 220 that is made of a relatively soft, flexible material for supporting the display system 10 on the user's nose when the user is not wearing a conventional pair of glasses. The nose piece 24 also includes a flange 224 that extends upwardly from a base 226 of the nose bridge 220 where the flange 224 is preferably formed of a relatively rigid plastic. The flange 224 on a front surface thereof includes a number of protrusions 227–229 to allow the nose piece 24 to be adjustably mounted in a nose piece holder 230. More particularly, the nose piece holder 230 includes an upwardly extending, generally rectangularly-shaped and hollow member 231 for receiving the flange 224. The nose bridge holder member 231 includes apertures 232, 233, and 234 that are vertically aligned so as to receive respective vertically aligned protrusions 227, 228, and 229 on the flange 224 when the nose piece 24 is in a fully retracted position. In order to increase the distance between the nose bridge 220 and the lens holder 16, the flange 224 is moved downward in the member 231 of the nose bridge holder so that the protrusions 227 and 228 extend through the apertures 233 and 234. To further increase the distance between the nose bridge 220 and the lens holder 16, the flange 224 is moved downwardly so that the protrusion 227 is received in the aperture 234. In this position, the nose bridge 220 is at its greatest distance from the lens holder 16. This adjustable mounting for the nose bridge 220 allows the distance between the lens holder 16 that supports the display 26 and the user's nose to be varied to adjust the optical path defined by the relative position of the display 26, the optical element 28, and the user's eye to be adjusted relative to a generally vertical axis defined by the apertures 232–234. This feature thus allows the display system 10 to more easily accommodate users having different head sizes and head configurations so that the display system 10 may be easily worn and the image of the displayed information be easily viewed via the optical element 28. It is noted that the nose bridge 220 may, or may not, be completely removable from the nose bridge holder 230.

As shown in FIGS. 28 and 29, the nose bridge holder 230 includes a base member 240 that extends at generally right angles from the upwardly extending member 231, the base member 240 having an aperture 242 therein so as to allow the flange 224 of the nose bridge to be received therein and extend upwardly into the member 231. The base 240 further includes a flange 244 extending outwardly therefrom. The upstanding member 231 of the nose bridge holder 230 also includes a flange 246 that extends at generally right angles from the upstanding member 231 and generally parallel to the flange 244 of the base 240. In order to mount the nose bridge holder 230 and in turn the nose bridge 220 on the frame 12, the flange 244 on the base 240 of the nose bridge holder 230 is inserted into the aperture 122 formed on the bottom surface 116 of the lens holder. At the same time, the flange 246 extending from the upstanding member 231 of the nose bridge holder 230 is inserted into the aperture formed by the indentation 100 of the lens holder and the rectangular recess 50 of the top cover 18 so that the flange 246 extends into the housing formed by the lens holder 16 and the top cover 18. In order to securely maintain the nose piece 24 in place, the base member 240 is formed with a lip or hook portion 250 to engage a wall defining the aperture 122 of the box 120. Thus, the nose piece 24 may be removably mounted on the frame 12 of the display system 10. The nose piece 24 is easily removed to allow the display system 16 to be worn with a pair of conventional glasses, as described in detail above.

Figure 31:
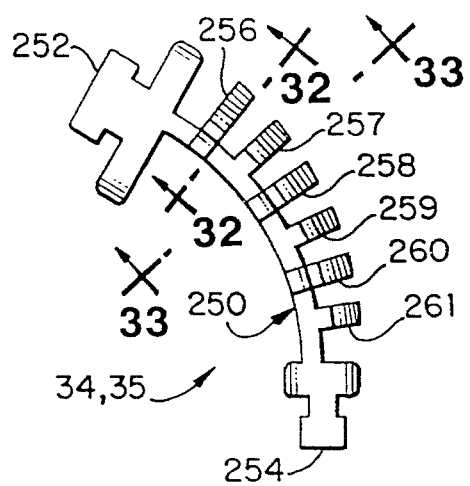
FIG. 31 is a bottom view of a hinge depicted in FIG. 1.
Figure 32:
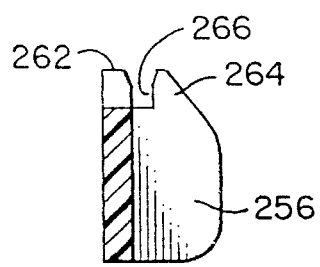
FIG. 32 is a cross sectional view of the hinge taken along lines A—A of FIG. 31.
Figure 33:
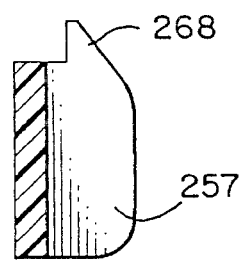
FIG. 33 is a cross sectional view of the hinge taken along lines B—B of FIG. 31.

An example of a hinge suitable for the hinges 34, 35 of the temples 20, 21, is depicted in FIG. 31. The hinge 34, 35 has an elongated body that is curved inwardly towards the user's head when the hinge is mounted on the lens holder 16. The body 250 includes a generally T-shaped mounting member 252 that is receivable in a T-shaped aperture 138, 140 so as to removably mount the hinge on the lens holder 16. The body 250 of the hinge 34, 35 at an opposite end of the member 252 has an additional generally T-shaped mounting member 254 that is received in an aperture 272 of the temple 20, 21 so as to secure the hinge 34, 35 to the remainder of the temple bar. The hinge body 250 also includes a number of outwardly extending ribs 256–261. Alternate ribs 256, 258 and 260 include a pair of generally parallel extending rib fingers 262 and 264, extending from the respective rib body so as to form an aperture 266 between the fingers 262 and 264 in order to maintain the wire 40, 41 of the earphone 38, 39 therein. Alternate ribs 257, 259, and 261 have only a single rib finger 268 extending therefrom so as to guide the wire 40, 41, but not retain it. The rib fingers 262 and 264 of each of the ribs 256, 258, and 260 are flexible so that the wire 40, 41 of the earphone may be easily inserted therein and removed therefrom.

Figure 34:
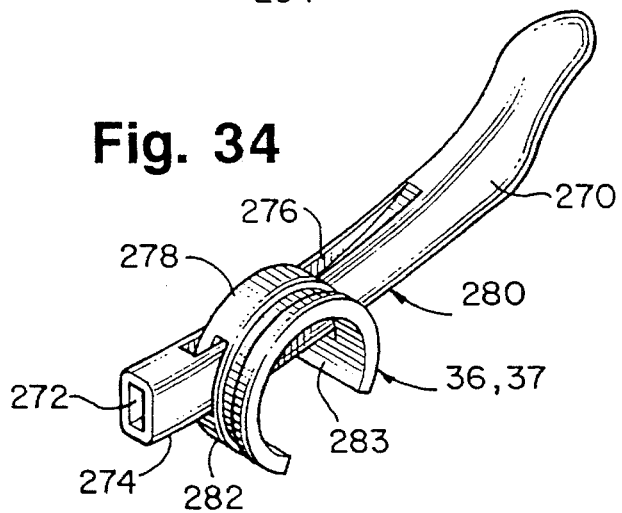
FIG. 34 is a perspective top view of the temple and earpiece retainer depicted in FIG. 1.
Figure 35:
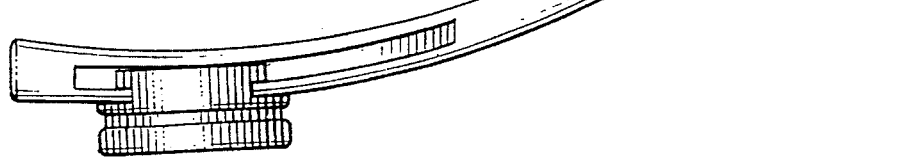
FIG. 35 is a top view of the temple and earpiece retainer depicted in FIG. 34.
Figure 36:
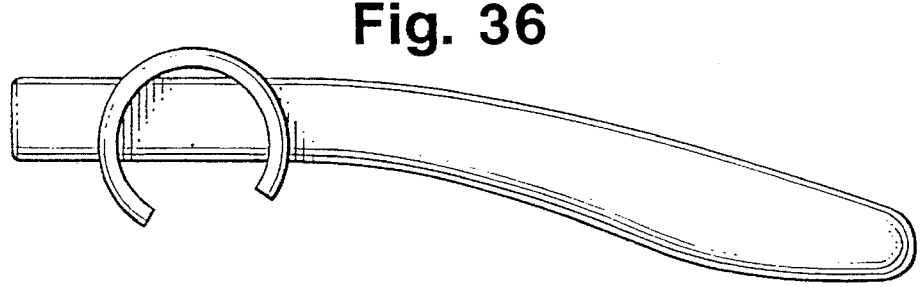
FIG. 36 is a side view of the temple and earpiece retainer depicted in FIG. 34.

The temple bar 270 of the temples 20, 21 is shown in FIGS. 34–36. The temple bar 270 includes an aperture 272 formed in an end 274 thereof so as to receive the generally T-shaped end 254 of the hinge 34, 35 to mount the temple 270 on the hinge 34, 35. The temple bar 270 includes a longitudinally extending groove 276 that is formed in an upper surface of the temple bar so as to guide a mounting member 278 of a ring earphone retainer 36, 37. Preferably, the temple bar 270 also includes a second groove, not shown, that extends longitudinally along a bottom surface 280 of the temple so as to receive portions 282 and 283 of the ring retainer 36, 37 therein. The grooves 276 guide the ring retainer 36, 37 along the length of the temple bar 270 so that the position of the ring retainer 36, 37 along the temple bar 270 may be adjusted. Further, the mounting members 278, 282, and 283 of the ring earphone retainers 36, 37 allow the retainer to be removably mounted on the temple bar 270. If a user of the display system 10 desires to use speakers or earphones different than the earphones 38, 39, the earphones 38, 39 can be removed, as described above. Similarly, the earphone ring retainers 36, 37 may be snapped off the temple bar 270 to remove them from the display system 10. Other earphones or booms that may be used with the display system 10 preferably have a mounting member that is receivable in the grooves 276 of the temple bar 270 to allow the earphone, speaker or boom to be mounted on the frame 12 of the system 10.

It is noted that an optical element 28, in accordance with the present invention, may also be used in a binocular or stereoscopic head-up display system. Further, the distance of the virtual image from the user could be varied by moving the display instead of the optical element 28. Many other modifications and variations of the present invention are possible in view of the above teachings, as will be apparent to one of ordinary skill in the art. Therefore it is to be understood that, within the scope of the appended claims, the invention may be practiced otherwise than as described hereinabove.

What is claimed and desired to be secured by Letters Patent is:

1. A head mounted display system comprising:

a support to mount the display system on a user's head;

a display mounted on the support for displaying an image;

an optical element having at least three surfaces including an entrance surface for receiving the image from said display, an exit surface wherein the user views the image directly through the exit surface and a reflective surface for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye; and a mounting member for mounting said optical element on said support spaced at a distance from said display, said mounting member adjustably mounting said optical element on said support to allow said optical element to be moved along a generally linear axis to vary the distance between said entrance surface and said display.

2. A head mounted display system as recited in claim 1 wherein each of said entrance surface, reflecting surface and exit surface are curved so as to contribute to the total magnification of said displayed image.

3. A head mounted display system as recited in claim 1 wherein said reflective and exit surfaces are spherical and said entrance surface is cylindrical.

4. A head mounted display system as recited in claim 1 wherein said reflective surface is flat and said exit surface is spherical.

5. A head mounted display system as recited in claim 4 wherein said entrance surface is spherical.

6. A head mounted display system as recited in claim 1 wherein the distance between said entrance surface and display is variable to accommodate for variations in the interpupillary distance of various users.

7. A head mounted display system as recited in claim 6 wherein said distance between said entrance surface and display is variable to increase or decrease the distance between said entrance surface and said display.

8. A head mounted display system as recited in claim 1 wherein said optical element is formed of a single block of material with said three surfaces being formed on said block between a pair of side surfaces, each of said side surfaces including a plurality of apertures aligned in a row extending generally parallel to said exit surface, each aperture on one side surface having an associated aperture on the other side surface to form a pair of apertures, and including a member for mounting said optical element on said support, said mounting member having a pair of protrusions extending therefrom for engagement with one of said pairs of said apertures such that the distance between said entrance surface and said display can be varied by varying the pair of apertures engaged by said mounting member protrusions.

9. A head mounted display system as recited in claim 8 wherein said support includes a transparency, said optical element mounting member being mounted on said transparency.

10. A head mounted display system as recited in claim 9 wherein said transparency includes a generally horizontally extending slot and said mounting member engages said slot for movement along said slot to allow the position of said optical element to be moved to accommodate users having different interpupillary distances.

11. A head mounted display system as recited in claim 1 wherein said entrance surface is toroidal.

12. A head mounted display system as recited in claim 1 wherein said optical element is formed of a solid block material.

13. A head mounted display system as recited in claim 12 wherein said solid block of material is poly-methyl-methacrylate.

14. A head mounted display system as recited in claim 1 wherein said optical element is a solid element of at least two different materials to form an achromat.

15. A head mounted display system as recited in claim 1 wherein said optical element is a solid element of at least two different materials such that at least one of the exit and entrance surfaces are formed of a first material that is different than a second material on which the reflective surface is formed.

16. A head mounted display system as recited in claim 15 wherein said first and second materials are bonded together to form said solid element.

17. A head mounted display system as recited in claim 1 wherein said optical element is hollow.

18. A head mounted display system as recited in claim 1 wherein said optical element includes an entrance lens on which said entrance surface is formed, an exit lens on which said exit surface is formed, a reflector on which said reflective surface is formed and a mounting member on which said entrance lens, exit lens and reflector are each mounted to form a hollow optical element.

19. A head mounted display system comprising:

a support to mount the display system on a user's head;

a display mounted on the support for displaying an image;

a solid block optical element having at least three surfaces including a cylindrical entrance surface for receiving the image from the display, a spherical exit surface wherein the user views the image directly through the exit surface and a spherical reflective surface for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye.

20. A head mounted display system as recited in claim 19 further including means for varying the distance at which said virtual image appears from said user.

21. A head mounted display system as recited in claim 20 wherein said distance varying means includes means for adjustably mounting said optical element to increase or decrease the distance between said entrance surface and said display.

22. A head mounted display system as recited in claim 19 wherein said optical element is formed of a single block of material with said three surfaces being formed on said block between a pair of side surfaces, each of said side surfaces including a plurality of apertures aligned in a row extending generally parallel to said exit surface, each aperture on one side surface having an associated aperture on the other side surface to form a pair of apertures, and including a member for mounting said optical element on said support, said mounting members having a pair of protrusions extending therefrom for engagement with one of said pairs of said apertures such that the distance between said entrance surface and said display can be varied by varying the pair of apertures engaged by said mounting member protrusions.

23. A head mounted display system as recited in claim 22 wherein said support includes a transparency, said optical element mounting member being mounted on said transparency.

24. A head mounted display system as recited in claim 23 wherein said transparency includes a generally horizontally extending slot and said mounting member engages said slot for movement along said slot to allow the position of said mirror to be moved to accommodate users having different interpupillary distances.

25. A head mounted display system as recited in claim 19 further including means for adjustably mounting said optical element to said support so as to accommodate users having different interpupillary distances.

26. A head mounted display system as recited in claim 19 wherein said optical element is a solid element of at least two different materials to form an achromat.

27. A head mounted display system as recited in claim 19 wherein said optical element is a solid element of at least two different materials such that at least one of the exit and entrance surfaces are formed of a first material that is different than a second material on which the reflective surface is formed.

28. A head mounted display system comprising:

a support to mount the display system on a user's head;

a display mounted on the support for displaying an image and a solid block optical element having at least three surfaces including a spherical entrance surface for receiving the image from the display, a spherical exit surface wherein the user views the image directly through the exit surface and a single reflective surface, said reflective surface being flat for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye.

29. A head mounted display system as recited in claim 28 wherein said entrance surface is spherical.

30. A head mounted display system as recited in claim 28 wherein said entrance surface is toroidal.

31. A head mounted display system as recited in claim 28 further including means for varying the distance at which said virtual image appears from said user.

32. A head mounted display system as recited in claim 31 wherein said distance varying means includes means for adjustably mounting said optical element to increase or decrease the distance between said entrance surface and said display.

33. A head mounted display system as recited in claim 28 wherein said optical element is formed of a single block of material with said three surfaces being formed on said block between a pair of side surfaces, each of said side surfaces including a plurality of apertures aligned in a row extending generally parallel to said exit surface, each aperture on one side surface having an associated aperture on the other side surface to form a pair of apertures, and including a member for mounting said optical element on said support, said mounting member having a pair of protrusions extending therefrom for engagement with one of said pairs of said apertures such that the distance between said entrance surface and said display can be varied by varying the pair of apertures engaged by said mounting member protrusions.

34. A head mounted display system as recited in claim 33 wherein said support includes a transparency, said optical element mounting member being mounted on said transparency.

35. A head mounted display system as recited in claim 34 wherein said transparency includes a generally horizontally extending slot and said mounting member engages said slot for movement along said slot to allow the position of said optical element to be moved to accommodate users having different interpupillary distances.

36. A head mounted display system as recited in claim 28 further including means for adjustably mounting said optical element to said support so as to accommodate users having different interpupillary distances.

37. A head mounted display system as recited in claim 28 wherein said optical element is a solid element of at least two different materials to form an achromat.

38. A head mounted display system as recited in claim 28 wherein said optical element is a solid element of at least two different materials such that at least one of the exit and entrance surfaces are formed of a first material that is different than a second material on which the reflective surface is formed. substantially greater than the path defined by the display, reflecting surface and user's eye.

39. A head mounted display system comprising:
a support to mount the display system on a user's head;
a display mounted on the support for displaying an image;
a hollow optical element having at least three surfaces including a spherical entrance surface for receiving the image from the display, a spherical exit surface wherein the user views the image directly through the exit surface and a single reflective surface, said reflecting surface being flat for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye.

40. A head mounted display system as recited in claim 39 further including means for varying the distance at which said virtual image appears from said user.

41. A head mounted display system as recited in claim 40 wherein said distance varying means includes means for adjustably mounting said optical element to increase or decrease the distance between said entrance surface and said display.

42. A head mounted display system as recited in claim 40 wherein said support includes a transparency having a generally horizontally extending slot and said distance varying means includes a mounting member for engaging said slot for movement along said slot to allow the position of said optical element to be moved to accommodate users having different interpupillary distances.

43. A head mounted display system as recited in claim 39 wherein said entrance surface is cylindrical.

44. A head mounted display system as recited in claim 43 wherein said entrance surface is toroidal.

45. A head mounted display system as recited in claim 39 further including means for adjustably mounting said optical element to said support so as to accommodate users having different interpupillary distances.

46. A head mounted display system as recited in claim 39 wherein said optical element includes an entrance lens on which said entrance surface is formed, an exit lens on which said exit surface is formed, a reflector on which said reflective surface is formed and a mounting member on which said entrance lens, exit lens and reflector are each mounted to form a hollow optical element.

47. A head mounted display system comprising:
a support to mount the display system on a user's head;
a display mounted on the support for displaying an image; and
a hollow optical element having at least three surfaces including an entrance surface for receiving the image from the display, a spherical exit surface wherein the user views the image directly through the exit surface and a flat reflective surface for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye with perceptible distortion less than 1%.

48. A head mounted display system as recited in claim 47 wherein said entrance surface is spherical.

49. A head mounted display system as recited in claim 47 wherein said entrance surface is flat.

50. A head mounted display system as recited in claim 47 further including means for varying the distance at which said virtual image appears from said user.

51. A head mounted display system as recited in claim 50 wherein said distance varying means includes means for adjustably mounting said optical element to increase or decrease the distance between said entrance surface and said display.

52. A head mounted display system as recited in claim 47 wherein said entrance surface is toroidal.

53. A head mounted display system as recited in claim 47 further including means for adjustably mounting said optical element to said support so as to accommodate users having different interpupillary distances.

54. A head mounted display system as recited in claim 53 wherein said support includes a transparency having a generally horizontally extending slot and said mounting member engages said slot for movement along said slot to allow the position of said optical element to be moved to accommodate users having different interpupillary distances.

55. A head mounted display system as recited in claim 47 wherein said entrance surface is toroidal.

56. A head mounted display system comprising:

a support to mount the display system on a user's head;

a video display mounted on the support for displaying a video image; and an optical element having at least three surfaces including an entrance surface for receiving the video image from said display, an exit surface wherein the user views the video image directly through the exit surface and a reflective surface for reflecting said video image from said entrance surface to said exit surface; and means for adjustably mounting said optical element on said support spaced from said display and to allow said optical element to be moved along a generally linear axis to vary the distance between said display and entrance surface.

57. A head mounted display system comprising:

a support to mount the display system on a user's head;

a video display mounted on the support for displaying a video image; and an optical element having at least three surfaces including a spherical entrance surface for receiving the video image from said display, spherical exit surface wherein the user views the video image directly through the spherical exit surface and a reflective surface for reflecting said video image from said spherical entrance surface to said spherical exit surface; and means for adjustably mounting said optical element on said support spaced from said display and to allow said optical element to be moved generally horizontally to accommodate users having different interpupillary distances.

58. A head mounted display system comprising:

a support to mount the display system on a user's head;

a video display mounted on the support for displaying a video image;

a solid optical element having at least three surfaces including an entrance surface for receiving a video image from the display, an exit surface wherein the user views the video image directly through the exit surface and a reflective surface for reflecting said video image from said entrance surface to said exit surface, said optical element being formed of at least a first material and a second material with at least one of said surfaces formed on said first material and another of said surfaces being formed on said second material, wherein said first and second materials form an achromat.

59. A head mounted display system as recited in claim 58 wherein said entrance surface and reflecting surface are formed on said first material and said exit surface is formed on said second material.

60. A head mounted display system as recited in claim 58 wherein said first material is polystyrene and said second material is poly-methyl-methacrylate.

61. A head mounted display system as recited in claim 58 wherein said entrance surface and exit surface are formed on said first material and said reflecting surface is formed on said second surface.

62. A head mounted display system as recited in claim 61 wherein said first material is poly-methyl-methacrylate and said second material is polystyrene.

63. A head mounted display system comprising:

a support to mount the display system on a user's head;

a display mounted on the support for displaying an image; and an optical element having at least three surfaces including an entrance surface for receiving the image from said display, an exit surface wherein the user views the image directly through the exit surface and a reflective surface for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye, wherein the image on the retina of an emmetropic eye has a normalized longitudinal axial chromatic aberration that is less than 58 microns.

64. A head mounted display system as recited in claim 63 wherein said aberration is less than 29 microns.

65. A head mounted display system comprising:

a support to mount the display system on a user's head;

a display mounted on the support for displaying an image; and an optical element having at least three surfaces including an entrance surface for receiving the image from said display, an exit surface wherein the user views the image directly through the exit surface and a reflective surface for reflecting said image from said entrance surface to said exit surface, the three surfaces of said optical element being shaped to generate a virtual image of said displayed image that is magnified and that appears to be at a location a distance from the user that is substantially greater than the path defined by the display, reflecting surface and user's eye, wherein the image on the retina of an emmetropic eye has a transverse axial chromatic aberration that is less than 28 microns.

66. A head mounted display system as recited in claim 65 wherein said aberration is less than 14 microns.

* * * * *